United States Patent [19]

McKenzie

[11] 4,064,314

[45] Dec. 20, 1977

[54] WEATHER-RESISTANT TRANSPARENT COMPOSITE FILM

[75] Inventor: Eugene L. McKenzie, North St. Paul, Minn.

[73] Assignee: Minnesota Mining and Manufacturing Company, St. Paul, Minn.

[21] Appl. No.: 568,474

[22] Filed: Apr. 16, 1975

[51] Int. Cl.² ............................................. B32B 27/36
[52] U.S. Cl. ................................... 428/483; 428/520; 428/910; 428/494; 428/913; 428/522; 156/108; 160/19; 160/21; 160/38
[58] Field of Search ................ 428/483, 520, 910, 913

[56] References Cited

U.S. PATENT DOCUMENTS

| | | | |
|---|---|---|---|
| 3,100,760 | 8/1963 | Brown et al. | 428/520 X |
| 3,179,552 | 4/1965 | Hauser et al. | 428/483 X |
| 3,194,725 | 7/1965 | Pounds | 428/520 X |
| 3,318,975 | 9/1967 | Deichert et al. | 428/483 X |
| 3,753,765 | 8/1973 | Morgan et al. | 428/910 X |
| 3,928,710 | 12/1975 | Arnold et al. | 428/483 |
| 3,940,523 | 2/1976 | Lecoeur et al. | 428/483 X |

*Primary Examiner*—P. C. Ives
*Attorney, Agent, or Firm*—Cruzan Alexander; Donald M. Sell; Roger R. Tamte

[57] ABSTRACT

A composite film structure which is useful as an inexpensive, nonbrittle, outdoor-facing window pane in greenhouses and similar structures, comprises an oriented support film laminated to a weather-resistant oriented film of polymethylmethacrylate.

8 Claims, 1 Drawing Figure

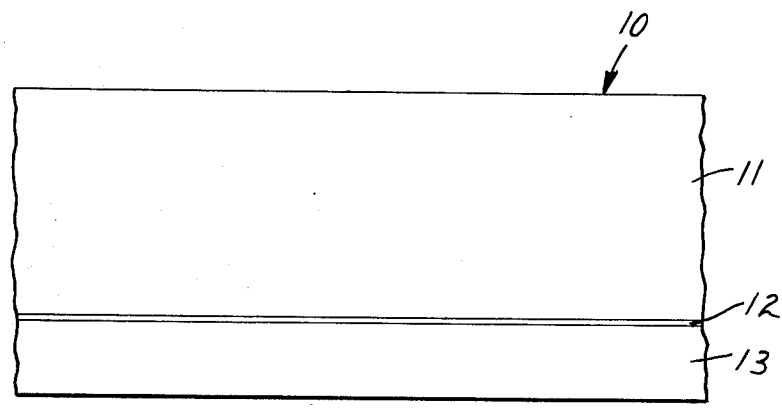

WEATHER-RESISTANT TRANSPARENT COMPOSITE FILM

The use of glass window panes in the outer walls and roofs of greenhouses and similar buildings adds greatly to the cost of those buildings. Initial construction costs are high because glass windows require expensive frame structures; and replacement costs are high because glass is easily broken during stormy weather, in various kinds of accidents, and by vandals.

Plastic films have been investigated as a replacement for glass in greenhouses, but all those tried have had serious deficiencies. Polyethylene has been the most commonly used, but outdoor exposure causes such a rapid deterioration in polyethylene — making the film hazy, dirty, and embrittled — that it can be used for only a season or two. Polyester films also deteriorate during outdoor exposure, especially in the presence of moisture, becoming hazy, physically weak, and susceptible to easy breaking. Polycarbonates and cast acrylic-based polymers have also been proposed, but in the forms suggested they are thick, inflexible, and expensive, and have a variety of other problems.

The present invention provides a new kind of composite polymeric film that is durable, inexpensive, and weather-resistant. This composite film comprises, briefly,
  a. a thin transparent high-tensile-strength support film comprising a linear, oriented, crystalline, heat-set polyester polymer;
  b. a thin transparent weather-resistant oriented polymethylmethacrylate film; and
  c. a transparent adhesive layer disposed between said support and weather-resistant films to laminate the films together.

Preferably an adsorber of ultraviolet light is dispersed in at least one of said films or adhesive layer to improve the weathering properties of the composite film.

DESCRIPTION OF THE DRAWING

The FIGURE shows an illustrative transparent composite film 10 of the invention. This composite film includes a weather-resistant film 11, a layer of adhesive 12, and a support film 13.

DETAILED DESCRIPTION

Oriented polymethylmethacrylate film has especially good weathering properties. Samples of it subjected to outdoor exposure tests for 10 years show no apparent degradation. One reason for these good weathering properties is that the film absorbs little if any ultraviolet light energy.

The film also has good physical properties, which are enhanced by the fact that it is prepared as an oriented film (generally biaxially oriented). The film is flexible and has good fatigue resistance, has a hard surface, has good tensile properties and is compatible with the associated components in the composite film. The film is generally less than about 100–150 micrometers in thickness to preserve flexibility, and is typically at least 25–50 micrometers in thickness. If desired, weather-resistant films may be adhered on both sides of the support film.

The most preferred support film is oriented heat-set polyethylene terephthalate. Such a film has good support properties (for example, it generally has a tensile strength of greater than about 20,000 pounds per square inch [about 1,500 kilograms per square centimeter]) and good durability when covered by the polymethylmethacrylate film. Other linear, orientable, crystallizable, heat-settable polyester polymers may be used (for example, such esters may be made from dibasic acids such as isophthalic, sebacic, bibenzoic, and 2,6-naphthoic acid), but polyethylene terephthalate has good properties and is commercially available at lowest cost. The support film can vary in thickness, for example, from 10 micrometers to 100 or 150 micrometers, and preferably is about 25 to 50 micrometers in thickness.

The adhesive used to laminate the weather-resistant and support films together should be a clear transparent adhesive. Preferably, it is a pressure-sensitive adhesive so that the laminating operation may be performed at room temperature. Pressure-sensitive adhesives based on esters of acrylic acid are particularly useful because of their good adhesion, clarity, light-transmissibility, and resistance to degradation by ultraviolet light. Rubber-resin adhesives having good resistance to ultraviolet light may also be used. In addition, heat-activated or solvent-activated adhesives are useful. Preferably the adhesive layer is flexible in the finished composite film structure so as to absorb strains and permit the composite film structure to be flexible even in extreme cold. Desirably the composite film of the invention is sufficiently flexible so that it may be wound in a storage roll, and for this purpose, it is desirable that the film be rollable about a 10-centimeter-diameter support mandrel.

Absorbers of ultraviolet light energy are preferably included in a composite film of the invention to further retard embrittlement of the polyester film. Desirably the absorber is included in one or more of the layers that cover the polyester film, and is preferably also included in the polyester film. Useful ultraviolet light absorbers include hydroxy benzophenones (such as "Uvinol 400" supplied by General Aniline Film), 2(2'-hydroxy-s'-methylphenyl) benzotriazole (such as "Tinuvin P" supplied by Ciba-Geigy), phenyl salicylate, and diphenyl phthalate.

The invention will further be illustrated by the following example. A three-mil-thick (75-micrometer-thick) biaxially oriented polymethylmethacrylate film containing 1 weight-percent of Uvinol 400 was prepared by mixing the absorber into a melt of the polymer ("Lucite 147" supplied by DuPont) and then extruding and orienting the mixture. A one-mil-thick (25-micrometer-thick) transparent biaxially oriented polyethylene terephthalate film containing 2 weight-percent dimerized benzophenone ultraviolet light-absorber was prepared by mixing the absorber into a melt of the polyethylene terephthalate, and then extruding and orienting the film and heat-setting it according to conventional techniques. A transparent solution of a pressure-sensitive adhesive copolymer of isooctyl acrylate and acrylic acid dissolved in a mixture of heptane and isopropanol solvent was then knife-coated onto the polyethylene terephthalate film to give a dry thickness of 0.05 mil (1.25 micrometers). After drying the coating in ovens heated to 150° F (65° C) for 10 minutes, the polymethylmethacrylate film was laminated against the adhesive by passing the assembly through squeeze rolls.

I claim:

1. A transparent composite film useful as an inexpensive, nonbrittle, outdoor-facing window pane comprising
  a. a continuous transparent high-tensile-strength oriented polymeric support film comprising a linear oriented crystalline heat-set polyester polymer;

b. a continuous transparent weather-resistant oriented polymethylmethacrylate film; and c. a transparent adhesive layer disposed between said support and weather-resistant films to laminate the films together.

2. A composite film of claim 1 in which an absorber of ultraviolet light is dispersed in at least one of said films or adhesive layer.

3. A composite film of claim 1 in which said weather-resistant film includes an absorber of ultraviolet light dispersed in the film.

4. A composite film of claim 1 in which said support film comprises polyethylene terephthalate.

5. A composite film of claim 1 in which said adhesive layer is a pressure-sensitive adhesive.

6. A composite film of claim 5 in which said pressure-sensitive adhesive comprises an adhesive polymer based on an ester of acrylic acid.

7. A transparent composite film useful as an inexpensive, nonbrittle, outdoor-facing window pane comprising a. a continuous transparent high-tensile-strength oriented polyethylene terephthalate film;

b. a continuous transparent weather-resistant oriented polymethylmethacrylate film; and c. a transparent adhesive layer comprising an adhesive polymer based on an ester of acrylic acid disposed between said support and weather-resistant films to laminate the films together.

8. A composite film of claim 7 in which an absorber of ultraviolet light is dispersed in at least one of said films or adhesive layer.

* * * * *